United States Patent
Nishiguchi et al.

(10) Patent No.: US 9,896,528 B2
(45) Date of Patent: Feb. 20, 2018

(54) CARBOXYL-GROUP-CONTAINING POLYMER COMPOSITION

(71) Applicant: Sumitomo Seika Chemicals Co., Ltd., Harima-cho, Kako-gun, Hyogo (JP)

(72) Inventors: Satoshi Nishiguchi, Himeji (JP); Ryosuke Murakami, Himeji (JP); Shingo Izawa, Himeji (JP); Masatoyo Yoshinaka, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 15/517,000

(22) PCT Filed: Oct. 7, 2015

(86) PCT No.: PCT/JP2015/078474
§ 371 (c)(1),
(2) Date: Apr. 5, 2017

(87) PCT Pub. No.: WO2016/056591
PCT Pub. Date: Apr. 14, 2016

(65) Prior Publication Data
US 2017/0291976 A1 Oct. 12, 2017

(30) Foreign Application Priority Data

Oct. 10, 2014 (JP) .................. 2014-209333

(51) Int. Cl.
| | |
|---|---|
| *C08F 220/04* | (2006.01) |
| *C08F 216/12* | (2006.01) |
| *C08K 5/103* | (2006.01) |
| *C08L 29/10* | (2006.01) |
| *C08L 33/02* | (2006.01) |

(52) U.S. Cl.
CPC .......... *C08F 220/04* (2013.01); *C08F 216/12* (2013.01); *C08K 5/103* (2013.01); *C08L 29/10* (2013.01); *C08L 33/02* (2013.01)

(58) Field of Classification Search
CPC ...... C08F 220/04; C08F 216/12; C08K 5/103; C08L 29/10; C08L 33/02
USPC ....................................................... 526/317
See application file for complete search history.

(56) References Cited

U.S. PATENT DOCUMENTS

| | | | |
|---|---|---|---|
| 2,923,692 A | 2/1960 | Ackerman | |
| 2,958,679 A | 11/1960 | Jones | |
| 3,426,004 A | 2/1969 | Wagner | |
| 6,869,994 B1 * | 3/2005 | Fujikake | C08F 220/04 524/111 |
| 2006/0280702 A1 | 12/2006 | SenGupta et al. | |
| 2013/0289011 A1 | 10/2013 | Yoshimaru | |

FOREIGN PATENT DOCUMENTS

| | | |
|---|---|---|
| JP | S58-084819 A | 5/1983 |
| JP | 2000-355614 A | 12/2000 |
| JP | 2005-314372 A | 11/2005 |
| JP | 2005-336126 A | 12/2005 |
| JP | 2005-343943 A | 12/2005 |
| JP | 2006-307037 A | 11/2006 |
| JP | 2007-291026 A | 11/2007 |
| JP | 2008-543752 A | 12/2008 |
| JP | 2014-169434 A | 9/2014 |
| JP | 2014-193823 A | 10/2014 |
| WO | WO 2012/023482 A1 | 2/2012 |

OTHER PUBLICATIONS

International Search Report in PCT/JP2015/078474, dated Dec. 28, 2015.

* cited by examiner

*Primary Examiner* — Ling Choi
*Assistant Examiner* — Ronald Grinsted
(74) *Attorney, Agent, or Firm* — Knobbe, Martens, Olson & Bear, LLP

(57) ABSTRACT

There is provided a carboxyl group-containing polymer composition having excellent water solubility and aqueous solution-thickening properties, having a minimal change in viscosity due to the thermal history in a drying step, and having high transparency of a neutral viscous solution obtained by mixing with water. The carboxyl group-containing polymer composition comprises (A) a carboxyl group-containing polymer obtained by copolymerization of an α,β-unsaturated carboxylic acid (a1) and a compound (a2) having at least two or more ethylenically unsaturated groups per molecule; (B) a polyhydric alcohol fatty acid ester alkylene oxide adduct; and (C) a polyoxyalkylene modified product, which is at least one of an ether (c1) of a polyoxyalkylene with a fatty alcohol, and a polyoxyalkylene fatty acid ester (c2).

8 Claims, No Drawings

CARBOXYL-GROUP-CONTAINING POLYMER COMPOSITION

TECHNICAL FIELD

The present invention relates to a carboxyl group-containing polymer composition. More specifically, the present invention relates to a carboxyl group-containing polymer composition having excellent water solubility and aqueous solution-thickening properties, having a minimal change in viscosity due to the thermal history in a drying step, and having high transparency of a neutral viscous solution obtained by mixing with water.

BACKGROUND ART

Conventionally, crosslinked carboxyl group-containing polymers are widely used in, for example, thickeners for cosmetics and the like, moisturizers for cataplasms and the like, emulsifiers, suspension stabilizers for suspended matter and the like, or gel bases for batteries and the like. Examples of those known as such crosslinked carboxyl group-containing polymers include a copolymer of an $\alpha,\beta$-unsaturated carboxylic acid such as acrylic acid and a polyallyl ether (Patent Literature 1), a copolymer of an $\alpha,\beta$-unsaturated carboxylic acid and hexaallyl trimethylene trisulfone (Patent Literature 2), a copolymer of an $\alpha,\beta$-unsaturated carboxylic acid and triallyl phosphate (Patent Literature 3), and a copolymer of an $\alpha,\beta$-unsaturated carboxylic acid and glycidyl methacrylate (Patent Literature 4).

These crosslinked carboxyl group-containing polymers, in the form of a neutral viscous solution prepared by dissolution in water, followed by neutralization with a neutralizer such as an alkaline compound, are used for purposes as described above.

A crosslinked carboxyl group-containing polymer needs to be prepared as a homogeneous aqueous solution, in order to be used for these purposes. A crosslinked carboxyl group-containing polymer, however, is generally produced as a powder, and when the powdery crosslinked carboxyl group-containing polymer is dissolved in water, masses (lumps) tend to be formed. Once lumps are formed, a gel layer is formed on their surface, slowing down the rate of penetration of water into the inside, making it difficult to obtain a homogeneous solution. Thus, when a crosslinked carboxyl group-containing polymer is used, in order to prevent the formation of lumps, it is necessary to gradually add the crosslinked carboxyl group-containing polymer into water with stirring at high speed, which is an operation with poor production efficiency, and even a special dissolution apparatus is sometimes required to prevent the formation of lumps.

On the other hand, a neutral viscous solution having a higher viscosity can find a wider range of uses as a thickener, and can also achieve a reduction in the amount of use. In recent years, therefore, the development of a polymer for use as a thickener that imparts a high viscosity has been eagerly anticipated.

To provide a crosslinked carboxyl group-containing polymer in which the formation of lumps as described above has been inhibited, Patent Literature 5, for example, proposes a technique that involves adding a specific amount of at least one compound of a polyhydric alcohol fatty acid ester and a polyhydric alcohol fatty acid ester alkylene oxide adduct when preparing a carboxyl group-containing polymer by polymerization of an $\alpha,\beta$-unsaturated carboxylic acid and the like.

CITATION LIST

Patent Literature

Patent Literature 1: Specification of U.S. Pat. No. 2,923,692
Patent Literature 2: Specification of U.S. Pat. No. 2,958,679
Patent Literature 3: Specification of U.S. Pat. No. 3,426,004
Patent Literature 4: JP 58-84819 A
Patent Literature 5: JP 2000-355614 A

SUMMARY OF INVENTION

Technical Problem

As a result of thorough research conducted by the present inventors, however, it was revealed that although the carboxyl group-containing polymer composition disclosed in Patent Literature 1 has excellent dispersibility (solubility) in water at a low concentration, i.e., about 0.5 mass %, the carboxyl group-containing polymer composition is difficult to disperse in water at a high concentration, i.e., about 3.0 mass %, for example. Even with other conventional techniques, it was difficult to prepare a homogeneous aqueous dispersion of a carboxyl group-containing polymer composition having a high concentration.

It was also revealed that the viscosity of a neutral viscous solution obtained from the above-described carboxyl group-containing polymer composition is readily affected by the thermal history in a drying step during the production of the carboxyl group-containing polymer composition, and the viscosity of the neutral viscous solution is more likely to change than the viscosity of a neutral viscous solution obtained using an additive-free carboxyl group-containing polymer to which neither a polyhydric alcohol fatty acid ester nor a polyhydric alcohol fatty acid ester alkylene oxide adduct has been added. Hence, the viscosity of the neutral viscous solution may significantly deviate from the target viscosity, due to a variation in the drying time in the drying step, for example.

Furthermore, high transparency may be demanded depending on the use of the thickener; however, the neutral viscous solution obtained using the above-described carboxyl group-containing polymer composition may have reduced transparency.

The present invention was made in view of the foregoing drawbacks of the conventional art, and a main object of the present invention is to provide a carboxyl group-containing polymer composition having excellent water solubility and aqueous solution-thickening properties, having a minimal change in the viscosity of a neutral viscous solution due to the thermal history in a drying step, and having high transparency of the neutral viscous solution obtained, by mixing with water.

Solution to Problem

The present inventors conducted extensive research to solve the aforementioned problem. As a result, the inventors found that a carboxyl group-containing polymer composition containing the following components (A) to (C) has excellent water solubility and aqueous solution-thickening properties, has a minimal change in viscosity due to the thermal history in a drying step, and has high transparency of a neutral viscous solution obtained by mixing with water. The present invention was accomplished by further conducting extensive research, based on this finding.

(A) A carboxyl group-containing polymer obtained by copolymerization of an α,β-unsaturated carboxylic acid (a1) and a compound (a2) having at least two or more ethylenically unsaturated groups per molecule;

(B) a polyhydric alcohol fatty acid ester alkylene oxide adduct; and (C) a polyoxyalkylene modified product, which is at least one of an ether (c1) of a polyoxyalkylene with a fatty alcohol, and a polyoxyalkylene fatty acid ester (c2).

In summary, the present invention provides aspects of invention as itemized below, Item 1. A carboxyl group-containing polymer composition comprising:

(A) a carboxyl group-containing polymer obtained by copolymerization of an α,β-unsaturated carboxylic acid (a1) and a compound (a2) having at least two or more ethylenically unsaturated groups per molecule;

(B) a polyhydric alcohol fatty acid ester alkylene oxide adduct; and (C) a polyoxyalkylene modified product, which is at least one of an ether (c1) of a polyoxyalkylene with a fatty alcohol, and a polyoxyalkylene fatty acid ester (c2).

Item 2. The carboxyl group-containing polymer composition according to item 1, wherein the polyoxyalkylene modified product (C) comprises a polyoxyalkylene modified product having an HLB value of 6 to 15.

Item 3. The carboxyl group-containing polymer composition according to item 1 or 2, wherein the polyoxyalkylene modified product (C) comprises a polyoxyalkylene modified product that is liquid at 25° C. under atmospheric pressure.

Item 4. The carboxyl group-containing polymer composition according to any of items 1 to 3, wherein the polyhydric alcohol fatty acid ester alkylene oxide adduct (B) comprises at least one of a polyhydric alcohol saturated fatty acid ester alkylene oxide adduct (b1) and a polyhydric alcohol unsaturated fatty acid ester alkylene oxide adduct (b2).

Item 5. The carboxyl group-containing polymer composition according to item 4, wherein an amount of the polyhydric alcohol saturated fatty acid ester alkylene oxide adduct (b1), per 100 parts by mass of the α,β-unsaturated carboxylic acid (a1), is 0.01 to 10 parts by mass.

Item 6. The carboxyl group-containing polymer composition according to item 4 or 5, wherein an amount of the polyhydric alcohol unsaturated fatty acid ester alkylene oxide adduct (b2), per 100 parts by mass of the α,β-unsaturated carboxylic acid (a1), is 0.1 to 5 parts by mass.

Item 7. The carboxyl group-containing polymer composition according to any of items 1 to 6, wherein an amount of the polyoxyalkylene modified product (C), per 100 parts by mass of the α,β-unsaturated carboxylic acid (a1), is 0.1 to 10 parts by mass.

Item 8. A neutral viscous solution, which is a mixture of the carboxyl group-containing polymer composition according to any of items 1 to 7, water, and an alkaline compound.

Advantageous Effects of Invention

According to the present invention, a carboxyl group-containing polymer composition can be provided which has excellent water solubility and aqueous solution-thickening properties, has a minimal change in viscosity due to the thermal history in a drying step, and has high transparency of a neutral viscous solution obtained by mixing with water. Furthermore, according to the present invention, a neutral viscous solution can be provided which is obtained by mixing the carboxyl group-containing polymer composition, water, and an alkaline compound.

DESCRIPTION OF EMBODIMENTS

The carboxyl group-containing polymer composition of the present invention has a feature in that it comprises (A) a carboxyl group-containing polymer obtained by copolymerization of an α,β-unsaturated carboxylic acid (a1) and a compound (a2) having at least two or more ethylenically unsaturated groups per molecule; (B) a polyhydric alcohol fatty acid ester alkylene oxide adduct; and (C) a polyoxyalkylene modified product, which is at least one of an ether (c1) of a polyoxyalkylene with a fatty alcohol, and a polyoxyalkylene fatty acid ester (c2). The following provides a detailed description of the carboxyl group-containing polymer composition of the present invention and a neutral viscous solution obtained using the carboxyl group-containing polymer composition. As used herein, the "neutral viscous solution" refers to a solution prepared by dispersing the carboxyl group-containing polymer composition in water, and subsequently adjusting the dispersion to a pH of about 7 (generally, pH=6 to 8), using a neutralizer such as an alkaline compound.

1. Carboxyl Group-Containing Polymer Composition

The carboxyl group-containing polymer composition of the present invention comprises (A) a carboxyl group-containing polymer obtained by copolymerization of an α,β-unsaturated carboxylic acid (a1) and a compound (a2) having at least two or more ethylenically unsaturated groups per molecule; (B) a polyhydric alcohol fatty acid ester alkylene oxide adduct; and (C) a polyoxyalkylene modified product, which is at least one of an ether (c1) of a polyoxyalkylene with a fatty alcohol, and a polyoxyalkylene fatty acid ester (c2).

(A) Carboxyl Group-Containing Polymer

The carboxyl group-containing polymer (A) is a copolymer obtained by copolymerization of an α,β-unsaturated carboxylic acid (a1) and a compound (a2) having at least two or more ethylenically unsaturated groups per molecule.

The α,β-unsaturated carboxylic acid (a1) is not particularly limited as long as it can form the carboxyl group-containing polymer (A), and examples thereof include unsaturated olefinic carboxylic acids having 3 to 5 carbon atoms, such as acrylic acid, methacrylic acid, crotonic acid, maleic acid, itaconic acid, and fumaric acid. Among these α,β-unsaturated carboxylic acids (a1), acrylic acid and methacrylic acid are suitably used, because they are inexpensive and readily available, and impart high transparency to an aqueous solution obtained using the resulting carboxyl group-containing polymer composition. The α,β-unsaturated carboxylic acids (a1) may be used alone or in combination of two or more.

The compound (a2) having at least two or more ethylenically unsaturated groups per molecule forms the carboxyl group-containing polymer (A) by copolymerization with the α,β-unsaturated carboxylic acid (a1). In the present invention, the compound (a2) having at least two or more ethylenically unsaturated groups per molecule serves as a cross-linking agent for the carboxyl group-containing polymer(A).

The compound (a2) having at least two or more ethylenically unsaturated groups per molecule is not particularly limited as long as it can form the carboxyl group-containing polymer (A) by copolymerization with the α,β-unsaturated carboxylic acid (a1), and examples thereof include di-substituted or higher acrylic acid esters of polyols; di-substituted or higher methacrylic acid esters of polyols; di-substituted or higher allyl ethers of polyols; diallyl phthalate, triallyl phosphate, allyl methacrylate, tetraallyloxyethane, triallyl cyanurate, divinyl adipate, vinyl crotonate, 1,5-hexadiene, and divinylbenzene. Examples of the above-described polyols include ethylene glycol, propylene glycol, polyoxyethylene glycol, polyoxypropylene glycol, glycerol, polyglycerol, trimethylolpropane, pentaerythritol, saccharose, and sorbitol. Among the above, pentaerythritol tetraallyl ether, pentaerythritol triallyl ether, pentaerythritol diallyl ether, tetraallyloxyethane, triallyl phosphate, and polyallyl saccharose are suitably used, because they facilitate adjusting the viscosity of the neutral viscous solution obtained using the resulting carboxyl group-containing polymer composition. The compounds (a2) having at least two or more ethylenically unsaturated groups per molecule may be used alone or in combination of two or more.

The amount of the compound (a2) having at least two or more ethylenically unsaturated groups per molecule used is preferably 0.01 to 10 parts by mass, more preferably 0.05 to 10 parts by mass, and still more preferably 0.05 to 3 parts by mass, per 100 parts by mass of the α,β-unsaturated carboxylic acid (a1). When the amount of the compound (a2) having at least two or more ethylenically unsaturated groups per molecule used is within the above-defined range, the viscosity-adjusting effect of the neutral viscous solution obtained using the resulting carboxyl group-containing polymer composition can be demonstrated even more suitably, and the carboxyl group-containing polymer composition can be suitably dissolved in water.

The carboxyl group-containing polymer (A) may be one obtained by copolymerizing other monomers in addition to the α,β-unsaturated carboxylic acid (a1) and the compound (a2) having at least two or more ethylenically unsaturated groups per molecule. Examples of other monomers include α,β-unsaturated compounds (compounds having α,β-unsaturated bonds) different from the above-described component (a1) or (a2).

The α,β-unsaturated compounds are not particularly limited as long as they differ from the above-described component (a1) or (a2), and examples thereof include acrylic acid esters such as methyl acrylate, ethyl acrylate, isopropyl acrylate, butyl acrylate, octyl acrylate, 2-ethylhexyl acrylate, decyl acrylate, lauroyl acrylate, stearyl acrylate, eicosanyl acrylate, behenyl acrylate, tetracosanyl acrylate, and glycidyl acrylate; methacrylic acid esters corresponding to the above-described acrylic acid esters; glycidyl ethers such as vinyl glycidyl ether, isopropenyl glycidyl ether, allyl glycidyl ether, and butenyl glycidyl ether; acrylamides such as acrylamide, N-methylacrylamide, N-ethylacrylamide, and N-t-butylacrylamide; methacrylamides corresponding to the above-described acrylamides; and vinyl esters such as vinyl acetate, vinyl propionate, and vinyl benzoate. Among these α,β-unsaturated compounds, acrylic acid esters and methacrylic acid esters are suitably used, and in particular, stearyl methacrylate, eicosanyl methacrylate, behenyl methacrylate, and tetracosanyl methacrylate are suitably used. The α,β-unsaturated compounds may be used alone or in combination of two or more. As acrylic acid esters or methacrylic acid esters, commercially available products such as those sold under the trade name BLEMMER VMA70 by NOF Corporation, for example, can be used.

The amount of the α,β-unsaturated compounds used is preferably 0.1 to 20 parts by mass, and more preferably 1 to 10 parts by mass, per 100 parts by mass of the α,β-unsaturated carboxylic acid (a1). When the amount of the α,β-unsaturated compounds used is within the above-defined range, the viscosity-adjusting effect of the neutral viscous solution obtained using the resulting carboxyl group-containing polymer composition can be demonstrated even more suitably.

(B) Polyhydric Alcohol Fatty Acid Ester Alkylene Oxide Adduct

The polyhydric alcohol fatty acid ester alkylene oxide adduct (B) is an alkylene oxide adduct of a polyhydric alcohol fatty acid ester. Examples of polyhydric alcohol fatty acid ester alkylene oxide adducts (B) include polyhydric alcohol saturated fatty acid ester alkylene oxide adducts (b1) and polyhydric alcohol unsaturated fatty acid ester alkylene oxide adducts (b2). The polyhydric alcohol fatty acid ester alkylene oxide adducts (B) may be used alone or in combination of two or more. For example, the carboxyl group-containing polymer composition of the present invention may contain at least one of a polyhydric alcohol saturated fatty acid ester alkylene oxide adduct (b1) and a polyhydric alcohol unsaturated fatty acid ester alkylene oxide adduct (b2). The carboxyl group-containing polymer composition of the present invention preferably contains both the components (b1) and (b2), in order to further improve the water solubility and aqueous solution-thickening properties of the carboxyl group-containing polymer composition of the present invention, further reduce a change in viscosity due to the thermal history in a drying step, and further increase the transparency of the neutral viscous solution obtained by mixing with water.

The polyhydric alcohol in the polyhydric alcohol saturated fatty acid ester alkylene oxide adduct (b1) is not particularly limited. Suitable examples of polyhydric alcohols include glycerol, polyglycerol, sorbitol, and sorbitan. The polyhydric alcohol may be one or a combination of two or more of the above.

Suitable examples of fatty acids in the polyhydric alcohol saturated fatty acid ester alkylene oxide adduct (b1) include stearic acid, isostearic acid, and palmitic acid. The fatty acid may be one or a combination of two or more of the above. Suitable examples of fatty acid esters in the component (b1) include hydrogenated castor oil and hydrogenated castor oil derivatives. The fatty acid ester may be one or a combination of two or more of the above.

Suitable examples of oxyalkylene chains in the polyhydric alcohol saturated fatty acid ester alkylene oxide adduct (b1) include an oxyalkylene chain represented by formula (1):

$$-(CH_2-CHR^1-O)_n- \quad \text{Formula (1)}$$

wherein the n number of $R^1$s each independently represent a hydrogen atom, a methyl group, or an ethyl group, and n represents an integer from 1 to 100.

Preferred specific examples of polyhydric alcohol saturated fatty acid ester alkylene oxide adducts (b1) include polyoxyethylene sorbitol saturated fatty acid esters, polyoxyethylene hydrogenated castor oil derivatives, and polyoxyethylene glycerol saturated fatty acid esters. Specific examples of polyoxyethylene sorbitol saturated fatty acid esters include polyoxyethylene sorbitol isostearate and polyoxyethylene sorbitol hexastearate. Specific examples of polyoxyethylene hydrogenated castor oil derivatives include polyoxyethylene hydrogenated castor oil, polyoxyethylene hydrogenated castor oil laurate, polyoxyethylene hydrogenated castor oil isostearate, and polyoxyethylene hydrogenated castor oil triisostearate. Specific examples of polyoxyethylene glycerol saturated fatty acid esters include polyoxyethylene glycerol monostearate, polyoxyethylene glycerol distearate, polyoxyethylene glycerol triisostearate, polyoxyethylene glycerol isostearate, polyoxyethylene glycerol diisostearate, and polyoxyethylene glycerol triisostearte.

Among the polyhydric alcohol saturated fatty acid ester alkylene oxide adducts (b1), particularly preferred examples include polyoxyethylene hydrogenated castor oil, polyoxyethylene hydrogenated castor oil isostearate, and polyoxyethylene hydrogenated castor oil triisostearate, because a carboxyl group-containing polymer composition having the intended water solubility can be obtained using only small amounts of these components (b1), these components (b1) allow the carboxyl group-containing polymer composition to disperse (dissolve) in water at a high concentration while effectively inhibiting the formation of lumps, and the resulting neutral viscous solution has high transparency. The polyhydric alcohol saturated fatty acid ester alkylene oxide adducts (b1) can be used alone or in combination of two or more.

When the carboxyl group-containing polymer composition of the present invention contains a polyhydric alcohol saturated fatty acid ester alkylene oxide adduct (b1), the amount thereof, per 100 parts by mass of the α,β-unsaturated carboxylic acid. (a1), is preferably 0.01 part by mass or more, more preferably 0.1 part by mass or more, and still more preferably 0.2 part by mass or more, in order to improve the dispersibility in water of the carboxyl group-containing polymer composition of the present invention, and is preferably 10 parts by mass or less, more preferably 7 parts by mass or less, and still more preferably 5 parts by mass or less, in order to inhibit an increase in the viscosity of the neutral viscous solution of the carboxyl group-containing polymer composition of the present invention. in the carboxyl group-containing polymer composition of the present invention, the amount of the polyhydric alcohol saturated fatty acid ester alkylene oxide adduct (b1), per 100 parts by mass of the α,β-unsaturated carboxylic acid (a1), is preferably 0.01 to 10 parts by mass, more preferably 0.1 to 7 parts by mass, and still more preferably 0.2 to 5 parts by mass, for example.

The polyhydric alcohol in the polyhydric alcohol unsaturated fatty acid ester alkylene oxide adduct (b2) is not particularly limited. Suitable examples of polyhydric alcohols include glycerol, polyglycerol, sorbitol, and sorbitan. The polyhydric alcohol may be one or a combination of two or more of the above.

Suitable examples of fatty acids in the polyhydric alcohol unsaturated fatty acid ester alkylene oxide adduct (b2) include oleic acid, linoleic acid, and palmitoleic acid. The fatty acid may be one or a combination of two or more of the above.

Suitable examples of fatty acid esters in the polyhydric alcohol unsaturated fatty acid ester alkylene oxide adduct (b2) include castor oil and castor oil derivatives. The fatty acid ester may be one or a combination of two or more of the above.

Suitable examples of oxyalkylene chains in the polyhydric alcohol unsaturated fatty acid ester alkylene oxide adduct (b2) include the oxyalkylene chain represented by formula (1) shown above.

Preferred specific examples of polyhydric alcohol unsaturated fatty acid ester alkylene oxide adducts (b2) include polyoxyethylene sorbitol unsaturated fatty acid esters, polyoxyethylene castor oil derivatives, and polyoxyethylene glycerol unsaturated fatty acid esters. Specific examples of polyoxyethylene sorbitol unsaturated fatty acid esters include polyoxyethylene sorbitol oleate, polyoxyethylene sorbitol hexaoleate, and polyoxyethylene sorbitol tetraoleate. Specific examples of polyoxyethylene castor oil derivatives include polyoxyethylene castor oil, polyoxyethylene castor oil laurate, polyoxyethylene castor oil isostearate, and polyoxyethylene castor oil triisostearate. Specific examples of polyoxyethylene glycerol unsaturated fatty acid esters include polyoxyethylene glycerol monooleate, polyoxyethylene glycerol monolinoleate, polyoxyethylene glycerol dioleate, polyoxyethylene glycerol dilinoleate, and polyoxyethylene glycerol trioleate.

Among the polyhydric alcohol unsaturated fatty acid ester alkylene oxide adducts (b2). particularly preferred examples include polyoxyethylene castor oil, polyoxyethylene castor oil isostearate, polyoxyethylene castor oil triisostearate, and polyoxyethylene sorbitol tetraoleate, because a carboxyl group-containing polymer composition having the intended water solubility can be obtained using only small amounts of these components (b2), these components (b2) allow the carboxyl group-containing polymer composition to disperse (dissolve) in water at a high concentration while effectively inhibiting the formation of lumps, and the resulting neutral viscous solution has high transparency. The polyhydric alcohol unsaturated fatty acid ester alkylene oxide adducts (b2) may be used alone or in combination of two or more.

When the carboxyl group-containing polymer composition of the present invention contains a polyhydric alcohol unsaturated fatty acid ester alkylene oxide adduct (b2), the amount thereof, per 100 parts by mass of the α,β-unsaturated carboxylic acid (a1), is preferably 0.1 part by mass or more, more preferably 0.2 part by mass or more, and still more preferably 0.3 part by mass or more, for example, in order to improve the dispersibility in water of the carboxyl group-containing polymer composition of the present invention, and is preferably 5 parts by mass or less, more preferably 3 parts by mass or less, and still more preferably 2 parts by mass or less, for example, in order to inhibit an increase in the viscosity of the neutral viscous solution of the carboxyl group-containing polymer composition of the present invention. In the carboxyl group-containing polymer composition of the present invention, the amount of the polyhydric alcohol unsaturated fatty acid ester alkylene oxide adduct (b2), per 100 parts by mass of the α,β-unsaturated carboxylic acid (a1), is preferably 0.1 to 5 parts by mass, more preferably 0.2 to 3 parts by mass, and still more preferably 0.3 to 2 parts by mass, for example.

(C) Polyoxyalkylene Modified Product

In the present invention, the polyoxyalkylene modified product (C) is a modified product of a polyoxyalkylene, and is at least one of an ether (c1) of a polyoxyalkylene with a fatty alcohol, and a polyoxyalkylene fatty acid ester (c2). The carboxyl group-containing polymer composition of the present invention additionally contains the polyoxyalkylene modified product (C) together with the polyhydric alcohol fatty acid ester alkylene oxide adduct (B), relative to the carboxyl group-containing polymer (A) described above, thereby demonstrating excellent characteristics, i.e., excellent water solubility and aqueous solution-thickening properties, a minimal change in viscosity due to the thermal history in a drying step, and high transparency of the neutral viscous solution obtained by mixing with water.

In each of the components (c1) and (c2), suitable examples of aliphatic groups of fatty alcohols or aliphatic groups of fatty acid esters include straight or branched alkyl or alkenyl groups having 8 to 20 carbon atoms. The aliphatic group in each of the components (c1) and (c2) may be one or a combination of two or more of the above.

Preferred specific examples of fatty alcohols in the ether (c1) of a polyoxyalkylene with a fatty alcohol include higher monohydric alcohols having 8 or more carbon atoms, and among these, particularly preferred specific examples include lauryl alcohol, stearyl alcohol, and isostearyl alcohol.

Preferred specific examples of fatty acids in the polyoxyalkylene fatty acid ester (c2) include monocarboxylic acids having 8 or more carbon atoms, and among these, particularly preferred specific examples include lauric acid, oleic acid, and isostearic acid.

Suitable examples of polyoxyalkylene chains in the ether (c1) of a polyoxyalkylene with a fatty alcohol and the polyoxyalkylene fatty acid ester (c2) include the oxyalkylene chain represented by formula (1) shown above.

Specific examples of ethers (c1) of polyoxyalkylenes with fatty alcohols include polyoxyethylene (2) lauryl ether, polyoxyethylene (3) lauryl ether, polyoxyethylene (4) lauryl ether, polyoxyethylene (6) lauryl ether, polyoxyethylene (5) stearyl ether, and polyoxyethylene (5) isostearyl ether.

Specific examples of polyoxyalkylene fatty acid esters (c2) include lauric acid polyethylene glycol-4 adduct, lauric acid polyethylene glycol-8 adduct, oleic acid polyethylene glycol 8-adduct, and isostearic acid polyethylene glycol-6 adduct.

The polyoxyalkylene modified product (C) may contain a polyoxyalkylene modified product having an HLB value preferably 6 or more, in order to impart high transparency to the neutral viscous solution of the carboxyl group-containing polymer composition of the present invention, and may contain a polyoxyalkylene modified product having an HLB value preferably 15 or less, in order to improve the dispersibility in water of the carboxyl group-containing polymer composition of the present invention. The polyoxyalkylene modified product (C) preferably contains a polyoxyalkylene modified product having an HLB value of 6 to 15. Even when the polyoxyalkylene modified product (C) contains the polyoxyalkylene modified product having such an HLB value, it may contain a polyoxyalkylene modified product not having such an HLB value. Particularly preferably, the HLB value of the polyoxyalkylene modified product (C) contained in the carboxyl group-containing polymer composition of the present invention (when the polyoxyalkylene modified product (C) contains a plurality of polyoxyalkylene modified products, the HLB value of the entire polyoxyalkylene modified product (C)) is within the above-defined range of HLB values.

The polyoxyalkylene modified product (C) preferably contains a polyoxyalkylene modified product that is liquid at 25° C. under atmospheric pressure, in order to improve the dispersibility in water of the carboxyl group-containing polymer composition of the present invention. Even when the polyoxyalkylene modified product (C) contains the polyoxyalkylene modified product that is liquid at 25° C. under atmospheric pressure, it may contain a polyoxyalkylene modified product that is not liquid at 25° C. under atmospheric pressure. Particularly preferably, the polyoxyalkylene modified product (C) contained in the carboxyl group-containing polymer composition of the present invention (when the polyoxyalkylene modified product (C) contains a plurality of polyoxyalkylene modified products, the entire polyoxyalkylene modified product (C)) is liquid at 25° C. under atmospheric pressure.

In the carboxyl group-containing polymer composition of the present invention, the amount of the polyoxyalkylene modified product (C), per 100 parts by mass of the α,β-unsaturated carboxylic acid (a1), is preferably 0.1 part by mass or more, and more preferably 0.2 part by mass or more, for example, in order to improve the dispersibility in water of the carboxyl group-containing polymer composition of the present invention, and is preferably 10 parts by mass or less, and more preferably 5 parts by mass or less, for example, in order to inhibit an increase in the viscosity of the neutral viscous solution of the carboxyl group-containing polymer composition of the present invention. In the carboxyl group-containing polymer composition of the present invention, the amount of the polyoxyalkylene modified product (C) is preferably 0.1 to 10 parts by mass, and more preferably 0.2 to 5 parts by mass, for example, per 100 parts by mass of the α,β-unsaturated carboxylic acid (a1).

In the carboxyl group-containing polymer composition of the present invention, the mass ratio [C]/[B] of the amount of the polyoxyalkylene modified product (C) to the amount of the polyhydric alcohol fatty acid ester (B) is preferably 0.1 to 4, and more preferably 0.2 to 2, for example, in order to improve the dispersibility in water of the carboxyl group-containing polymer composition of the present invention.

2. Method for Producing the Carboxyl Group-Containing Polymer Composition

The method for producing the carboxyl group-containing polymer composition of the present invention is not particularly limited as long as it can produce a composition containing (A) a carboxyl group-containing polymer that is a copolymer of an α,β-unsaturated carboxylic acid (a1) and a compound (a2) having at least two or more ethylenically unsaturated groups per molecule; (B) a polyhydric alcohol fatty acid ester alkylene oxide adduct and (C) a polyoxyalkylene modified product. The carboxyl group-containing polymer composition of the present invention can be suitably produced using the following methods (1) to (4), for example.

Method (1)

A method in which the α,β-unsaturated carboxylic acid (a1) and the compound (a2) having at least two or more ethylenically unsaturated groups per molecule are polymerized in the presence of predetermined amounts of the polyhydric alcohol fatty acid ester alkylene oxide adduct (B) and the polyoxyalkylene modified product (C) from the beginning of the polymerization.

Method (2)

A method in which the α,β-unsaturated carboxylic acid (a1) and the compound (a2) having at least two or more ethylenically unsaturated groups per molecule are mixed, and then the α,β-unsaturated carboxylic acid (a1) and the compound (a2) having at least two or more ethylenically unsaturated groups per molecule are polymerized while continuously adding predetermined amounts of the polyhydric alcohol fatty acid ester alkylene oxide adduct (B) and the polyoxyalkylene modified product (C) thereto.

Method (3)

A method in which the α,β-unsaturated carboxylic acid (a1) and the compound (a2) having at least two or more ethylenically unsaturated groups per molecule are initially polymerized, and after the completion of the polymerization, the polyhydric alcohol fatty acid ester alkylene oxide adduct (B) and the polyoxyalkylene modified product (C) are added to the resulting slurry.

Method (4)

A method in which the α,β-unsaturated carboxylic acid (a1), the polyhydric alcohol fatty acid ester alkylene oxide adduct (B), and the polyoxyalkylene modified product (C) are mixed, and then the polymerization is performed while continuously adding the compound (a2) having at least two or more ethylenically unsaturated groups per molecule to the resulting mixture.

A specific method for producing the carboxyl group-containing polymer composition of the present invention will now be described, using the above-described method (1) as an example. Initially, a reaction vessel equipped with a stirrer, a thermometer, a nitrogen gas inlet tube, and a condenser tube is charged with a previously weighed, desired amount of each of the α,β-unsaturated carboxylic acid (a1), the compound (a2) having at least two or more ethylenically unsaturated groups per molecule, the polyhydric alcohol fatty acid ester alkylene oxide adduct (B), and the polyoxyalkylene modified product (C), together with a radical polymerization initiator and a reaction solvent (inert solvent). Next, the contents in the reaction vessel are mixed with stirring to give a homogeneous composition, and then nitrogen gas is blown into the contents to remove oxygen gas contained in upper space of the reaction vessel and dissolved oxygen dissolved in the contents. The polymerization reaction can be performed by heating to 20 to 120° C., preferably 30 to 90° C., in a warm bath, for example. The polymerization reaction is generally completed in 2 to 10 hours. After the completion of the polymerization reaction, the reaction solvent (inert solvent) is distilled off from the reaction solution by heating under reduced pressure or normal pressure. In this manner, the carboxyl group-containing polymer composition of the present invention can be obtained as a white fine powder.

Reaction Solvent

The reaction solvent to be used in the production method of the present invention is not particularly limited as long as it is a solvent inert (inert solvent) to the above-described polymerization reaction; however, the reaction solvent is preferably a solvent that dissolves the monomers including the α,β-unsaturated carboxylic acid (a1) as a main component, but is unlikely to dissolve the resulting carboxyl group-containing polymer composition. Examples of such solvents include aliphatic hydrocarbons such as normal pentane, normal hexane, isohexane, normal heptane, normal octane, and isooctane; alicyclic hydrocarbons such as cyclopentane, methylcyclopentane, cyclohexane, and methylcyclohexane; aromatic hydrocarbons such as benzene, toluene, and xylene; halogenated compounds such as chlorobenzene and ethylene dichloride; acetic acid alkyl esters such as ethyl acetate and isopropyl acetate; and ketone compounds such as methyl ethyl ketone and methyl isobutyl ketone. Among these reaction solvents, normal hexane, cyclohexane, normal heptane, ethylene dichloride, and ethyl acetate are suitably used, because they are stable in quality and readily available. The reaction solvents may be used alone or in combination of two or more.

The amount of the reaction solvent used is preferably 200 to 10,000 parts by mass, and more preferably 300 to 2,000 parts by mass, per 100 parts by mass of the α,β-unsaturated carboxylic acid (a1). When the amount of the reaction solvent used is within this range, precipitation of the carboxyl group-containing polymer composition along with the progress of the polymerization reaction is inhibited, and homogeneous stirring of the reaction system can be suitably performed, which facilitates controlling the reaction. Furthermore, a reduction in the yield of the carboxyl group-containing polymer composition per batch of polymerization is inhibited, leading to an economic improvement.

Radical Polymerization Initiator

The radical polymerization initiator to be used in the production method of the present invention is not particularly limited, and examples thereof include α,α'-azobisisobutyronitrile, 2,2'-azobis-2,4-dimethylvaleronitrile, 2,2'-azobismethylisobutyrate, benzoyl peroxide, lauroyl peroxide, cumene hydroperoxide, and tert-butyl hydroperoxide. These radical polymerization initiators may be used alone or in combination of two or more.

The amount of the radical polymerization initiator used is preferably 0.01 to 0.45 part by mass, and more preferably 0.01 to 0.35 part by mass, per 100 parts by mass of the α,β-unsaturated carboxylic acid (a1). When the amount of the radical polymerization initiator used is within this range, a reduction in the rate of the polymerization reaction is inhibited, and the intended carboxyl group-containing polymer composition can be economically produced. Furthermore, the rate of the polymerization reaction is inhibited from becoming excessively high, and the reaction can be suitably controlled.

Inert Gas

Generally, the atmosphere for the polymerization reaction system in the production method of the present invention is preferably an inert gas atmosphere such as nitrogen gas or argon gas. The reaction temperature during polymerization is preferably set to 50 to 90° C., and more preferably 55 to 80° C., in order to facilitate controlling the reaction by inhibiting an increase in the viscosity of the reaction solution, and control the bulk density of the resulting carboxyl group-containing polymer composition. The reaction time for polymerization is generally from 0.5 to 10 hours, although it varies depending on the reaction temperature and thus, cannot be unequivocally determined. The intended carboxyl group-containing polymer composition can be isolated as a white fine powder, by performing a drying step of drying the solvent after the completion of the reaction, to remove the solvent by heating the reaction solution to 80 to 120° C.

The carboxyl group-containing polymer composition obtained by the production method of the present invention is characterized by having excellent water solubility and aqueous solution-thickening properties when it is dissolved in water at a high concentration, having a minimal change in viscosity due to the thermal history in the drying step, and having high transparency of the neutral viscous solution obtained by mixing with water.

3. Neutral Viscous Solution

The neutral viscous solution of the present invention is a solution prepared by obtaining an aqueous dispersion in which the above-described carboxyl group-containing polymer composition is dispersed in water, and subsequently adjusting the dispersion to a pH of about 7 (generally, pH=6 to 8), using a neutralizer such as an alkaline compound. That is, the neutral viscous solution of the present invention is a mixture of the above-described carboxyl group-containing polymer composition, water, and an alkaline compound.

Examples of alkaline compounds used to prepare the neutral viscous solution of the present invention include sodium hydroxide and triethanolamine. The alkaline compounds may be used alone or in combination of two or more.

As described above, the carboxyl group-containing polymer composition of the present invention is unlikely to form lumps when it is dissolved in water, and exhibits excellent solubility in water; thus, the aqueous dispersion can contain a high concentration of the carboxyl group-containing polymer composition. The concentration of the carboxyl group-containing polymer composition in the aqueous dispersion is preferably 0.1 mass % or more, and more preferably about 0.5 to 5 mass %, for example. The concentration of the carboxyl group-containing polymer composition in the neutral viscous solution of the present invention obtained by neutralizing the aqueous dispersion is preferably 0.05 mass % or more, and more preferably about 0.1 to 3.0 mass %, for example.

The viscosity of the neutral viscous solution of the present invention is preferably about 20,000 to 80,000 mPa·s, and more preferably about 30,000 to 70,000 mPa·s, for example, although not particularly limited thereto. The viscosity of the neutral viscous solution is a value measured using the method described in the Examples below.

The light transmittance of the neutral viscous solution of the present invention is preferably 85% T or more, and more preferably 90% T or more, although not particularly limited thereto. The light transmittance of the neutral viscous solution is a value measured using the method described in the Examples below.

EXAMPLES

The present invention will be described below with reference to examples and comparative examples; however, the invention is not limited thereto. Carboxyl group-containing polymer compositions obtained in accordance with the examples and comparative examples were evaluated using the following evaluation methods.

(1) Swelling Time without Stirring (1-1) Swelling Time Without Stirring (Concentration: 3 Mass %)

In a 200-mL volume beaker, 100 g of ion exchange water was placed, and the temperature of the ion exchange water was adjusted to 25° C. Into this beaker, 3.0 g of a carboxyl group-containing polymer composition was added at once under non-stirring conditions, and the swollen state of the carboxyl group-containing polymer composition was visually observed to measure the time (min) required until the carboxyl group-containing polymer composition became completely wet without any dry portions. When the time required for swelling was 30 minutes or shorter, the carboxyl group-containing polymer composition was determined to have good swelling properties. Furthermore, when the time required for swelling was 20 minutes or shorter, the carboxyl group-containing polymer composition was determined to have excellent swelling properties, and have good dispersibility in water at a high concentration, without a tendency to form lumps. When the carboxyl group-containing polymer composition was still not completely swollen with remaining dry portions even after more than 60 minutes, the swelling time was evaluated as "60<". The results are shown in Table 1.

(1-2) Swelling Time without Stirring (Concentration: 0.5 Mass %)

In a 500-mL volume beaker, 300 g of ion exchange water was placed, and the temperature of the ion exchange water was adjusted to 25° C. Into this beaker, 1.5 g of a carboxyl group-containing polymer composition was added at once under non-stirring conditions, and the swollen state of the carboxyl group-containing polymer composition was visually observed to measure the time (min) required until the carboxyl group-containing polymer composition became completely wet without any dry portions. When the time required for swelling was 15 minutes or shorter, the carboxyl group-containing polymer composition was determined to have good swelling properties. Furthermore, when the time required for swelling was 10 minutes or shorter, the carboxyl group-containing polymer composition was determined to have excellent swelling properties, and have good dispersibility in water at a high concentration, without a tendency to form lumps. When the carboxyl group-containing polymer composition was still not completely swollen with remaining dry portions even after more than 60 minutes, the swelling time was evaluated as "60<". The results are shown in Table 1.

(2) Viscosity of Neutral Viscous Solution

In a 500-mL volume beaker, 297.0 g of ion exchange water was placed, and the temperature of the ion exchange water was adjusted to 25° C. Into this beaker, 3.0 g of a carboxyl group-containing polymer composition was added at once while stirring at a rotation speed of 300 r/min, using a stirrer equipped with a four-blade paddle (blade diameter: 50 mm), and the dispersed state of the carboxyl group-containing polymer composition was visually observed to completely disperse the carboxyl group-containing polymer composition without forming lumps. The resulting aqueous dispersion was neutralized to pH=7 with an 18 mass % aqueous sodium hydroxide solution to obtain a neutral viscous solution for evaluation. The viscosity after 60 seconds was measured for the neutral viscous solution for evaluation, using a Brookfield viscometer under the following conditions: rotor No. 7, 20 revolutions per minute, and a temperature of 25° C.

In the case of an additive-free carboxyl group-containing polymer, the viscosity of the neutral viscous solution increases due to the thermal history applied to the product during drying. Furthermore, an increase in the viscosity of the carboxyl group-containing polymer composition containing additives such as the polyhydric alcohol fatty acid ester alkylene oxide adduct (B) and the polyoxyalkylene modified product (C) is greater than that of the additive-free carboxyl group-containing polymer. Thus, in order to make the thermal history applied to the carboxyl group-containing polymer composition constant, the drying temperature and time were fixed (100° C. and 5 hours), and the viscosity was compared with that of the additive-free carboxyl group-containing polymer to evaluate an increase in the viscosity of the carboxyl group-containing polymer composition. When the viscosity ratio relative to the below-described Comparative Example 3 (additive-free carboxyl group-containing polymer) was 1.7-fold or less, the viscosity was determined to be appropriate, with a minimal change in viscosity due to the thermal history in the drying step. The results are shown in Table 1.

(3) Light Transmittance of Neutral Viscous Solution

In a 500-mL volume beaker, 150.0 g of the neutral viscous solution obtained for the evaluation of (2) Viscosity of Neutral Viscous Solution above and 150.0 g of ion exchange water previously adjusted to a temperature of 25° C. were placed, and the contents were stirred at a rotation speed of 300 r/min, using a stirrer equipped with a four-blade paddle (blade diameter: 50 mm). The resulting viscous solution was used as the neutral viscous solution for evaluation. The transmittance of light at a wavelength of 425 nm was measured for the neutral viscous solution for evaluation, using a spectrophotometer (Shimadzu Corporation; model number: UV-3150). When the light transmittance was 85% or more and less than 90%, the transparency was determined to be relatively high; when the light transmittance was 90% or more and less than 95%, the transparency was determined to be high; and when the light transmittance was 95% or more, the transparency was determined to be very high. The results are shown in Table 1.

Example 1

A 500-mL volume four-necked flask equipped with a stirrer, a thermometer, a nitrogen inlet tube, and a condenser tube was charged with 40 g of acrylic acid as the α,β-unsaturated carboxylic acid (a1); 0.88 g of BLEMMER VMA70 (NOF Corporation; a mixture containing 10 to 20 parts by mass of stearyl methacrylate, 10 to 20 parts by mass of eicosanyl methacrylate, 59 to 80 parts by mass of behenyl methacrylate, and 1 mass % or less of tetracosanyl methacrylate) as an α,β-unsaturated compound; 0.20 g of pentaerythritol allyl ether (a mixture of triallyl ether and tetraallyl ether) as the compound (a2) having two or more ethylenically unsaturated groups per molecule; 0.116 g of 2,2'-azobis(methyl isobutyrate) as a radical polymerization initiator; and 230.9 g of normal hexane as the reaction solvent. Subsequently, the solution was homogeneously mixed with stirring, and then nitrogen gas was blown into the solution to remove oxygen present in upper space of the reaction vessel (four-necked flask), the raw materials, and the reaction solvent. Next, the contents were held at 60 to 65° C. in a nitrogen atmosphere. One hour after the temperature reached 60° C., a dispersion of 0.80 g of polyoxyethylene hydrogenated castor oil triisostearate (Nihon Emulsion Co., Ltd.; EMALEX RWIS-350) as the polyhydric alcohol saturated fatty acid ester alkylene oxide adduct (b1) in 6.0 g of normal hexane was added into the reaction vessel. Thereafter, the reaction was continued for 2 hours. After the completion of the reaction, a solution of 0.20 g of polyoxyethylene castor oil (Nikko Chemicals Co., Ltd.; Nikkol CO3) as the polyhydric alcohol unsaturated fatty acid ester alkylene oxide adduct (b2) and 0.80 g of monoisostearic acid polyethylene glycol-6 adduct (Nihon Emulsion Co., Ltd.; EMALEX PEIS-6EX) as the polyoxyalkylene fatty acid ester (c2) in 12.0 g of normal hexane was added into the reaction vessel, and the reaction was further continued for 1 hour. Thereafter, the resulting slurry was heated to 100° C. to distill off the normal hexane, and the product was further dried under reduced pressure at 115° C. and 10 mmHg for 8 hours, thereby obtaining 38 g of a carboxyl group-containing polymer composition as a white fine powder.

Example 2

Following the procedure of Example 1, except that the monoisostearic acid polyethylene glycol-6 adduct as the polyoxyalkylene fatty acid ester (c2) was replaced by polyoxyethylene (4) lauryl ether (Kao Corporation; EMULGEN 104P) as the ether (c1) of a polyoxyalkylene with a fatty alcohol, 37 g of a carboxyl group-containing polymer composition was obtained as a white fine powder.

Example 3

Following the procedure of Example 1, except that the monoisostearic acid polyethylene glycol-6 adduct as the component (c2) was replaced by polyoxyethylene (3) lauryl ether (Kao Corporation; EMULGEN 103) as the component (c1), 37 g of a carboxyl group-containing polymer composition was obtained as a white fine powder.

Example 4

Following the procedure of Example 1, except that the monoisostearic acid polyethylene glycol 6-adduct as the component (c2) was replaced by polyoxyethylene (2) lauryl ether (Kao Corporation; EMULGEN 102KG) as the component (c1), 37 g of a carboxyl group-containing polymer composition was obtained as a white fine powder.

Example 5

Following the procedure of Example 1, except that the monoisostearic acid polyethylene glycol-6 adduct as the component (c2) was replaced by polyoxyethylene (5) lauryl ether (Kao Corporation; EMULGEN 105) as the component (c1), 35 g of a carboxyl group-containing polymer composition was obtained as a white fine powder.

Example 6

Following the procedure of Example 1, except that the monoisostearic acid polyethylene glycol-6 adduct as the component (c2) was replaced by polyoxyethylene (5) isostearyl ether (Nihon Emulsion Co., Ltd.; EMALEX 1805) as the component (c1), 38 g of a carboxyl group-containing polymer composition was obtained as a white fine powder.

Example 7

Following the procedure of Example 1, except that the amount of the monoisostearic acid polyethylene glycol-6 adduct as the component (c2) added was changed to 0.10 g, 36 g of a carboxyl group-containing polymer composition was obtained as a white fine powder.

Example 8

Following the procedure of Example 1, except that the amount of the monoisostearic acid polyethylene glycol-6 adduct as the component (c2) added was changed to 2.0 g, 38 g of a carboxyl group-containing polymer composition was obtained as a white fine powder.

Example 9

A 500-mL volume four-necked flask equipped with a stirrer, a thermometer, a nitrogen inlet tube, and a condenser tube was charged with 40 g of acrylic acid as the α,β-unsaturated carboxylic acid (a1); 0.88 g of BLEMMER VMA70 (NOF Corporation; a mixture containing 10 to 20 parts by mass of stearyl methacrylate, 10 to 20 parts by mass of eicosanyl methacrylate, 59 to 80 parts by mass of behenyl methacrylate, and 1 mass % or less of tetracosanyl methacrylate) as an α,β-unsaturated compound; 0.20 g of pentaerythritol allyl ether (a mixture of triallyl ether and tetraallyl ether) as the compound (a2) having two or more ethylenically unsaturated groups per molecule; 0.116 g of 2,2'-azobis(methyl isobutyrate) as a radical polymerization initiator; and 230.9 g of normal hexane as the reaction solvent. Subsequently, the solution was homogeneously mixed with stirring, and then nitrogen gas was blown into the solution to remove oxygen present in upper space of the reaction vessel (four-necked flask), the raw materials, and the reaction solvent. Next, the contents were held at 60 to 65° C. in a nitrogen atmosphere. One hour after the temperature reached 60° C., a solution of 0.80 g of polyoxyethylene hydrogenated castor oil triisostearate (Nihon Emulsion Co., Ltd.; EMALEX RWIS-350) as the polyhydric alcohol saturated fatty acid ester alkylene oxide adduct (b1), 0.20 g of polyoxyethylene castor oil (Nikko Chemicals Co., Ltd.; Nikkol CO3) as the polyhydric alcohol unsaturated fatty acid ester alkylene oxide adduct (b2), and 0.80 g of monoisostearic acid polyethylene glycol-6 adduct (Nihon Emulsion Co., Ltd.; EMALEX PEIS-6EX) as the polyoxyalkylene fatty acid ester (c2) in 6.0 g of normal hexane was added into the reaction vessel. Thereafter, the reaction was continued for 2 hours. After the completion of the reaction, the resulting slurry was heated to 100° C. to distill off the normal hexane, and the product was further dried under reduced pressure at 115° C. and 10 mmHg for 5 hours, thereby obtaining 35 g of a carboxyl group-containing polymer composition as a white fine powder.

Example 10

A 500-mL volume four-necked flask equipped with a stirrer, a thermometer, a nitrogen inlet tube, and a condenser tube was charged with 40 g of acrylic acid as the α,β-unsaturated carboxylic acid (a1); 0.88 g of BUMMER VMA70 (NOF Corporation; a mixture containing 10 to 20 parts by mass of stearyl methacrylate, 10 to 20 parts by mass of eicosanyl methacrylate, 59 to 80 parts by mass of behenyl methacrylate, and 1 mass % or less of tetracosanyl methacrylate) as an α,β-unsaturated compound; 0.20 g of pentaerythritol allyl ether (a mixture of triallyl ether and tetraallyl ether) as the compound (a2) having two or more ethylenically unsaturated groups per molecule; 0.116 g of 2,2'-azobis(methyl isobutyrate) as a radical polymerization initiator; and 230.9 g of normal hexane as the reaction solvent. Subsequently, the solution was homogeneously mixed with stirring, and then nitrogen gas was blown into the solution to remove oxygen present in upper space of the reaction vessel (four-necked flask), the raw materials, and the reaction solvent. Next, the contents were held at 60 to 65° C. for 3 hours in a nitrogen atmosphere. Thereafter, the resulting slurry was heated to 100° C., to distill off the normal hexane, and the product was further dried under reduced pressure at 115° C. and 10 mmHg for 8 hours, thereby obtaining 38 g of a white fine powder. 38 g of the resulting white fine powder was again placed in the reaction vessel. Next, a solution of 0.76 g of polyoxyethylene hydrogenated castor oil triisostearate (Nihon Emulsion Co., Ltd.; EMALEX RWIS-350) as the polyhydric alcohol saturated fatty acid ester alkylene oxide adduct (b1), 0.19 g of polyoxyethylene castor oil (Nikko Chemicals Co., Ltd.; Nikkol CO3) as the polyhydric alcohol unsaturated fatty acid ester alkylene oxide adduct (b2), and 0.76 g of monoisostearic acid polyethylene glycol-6 adduct (Nihon Emulsion Co., Ltd.; EMALEX PEIS-6EX) as the polyoxyalkylene fatty acid ester (c2) in 100 g of normal hexane was added into the reaction vessel and stirred for 1 hour. After the completion of stirring, the resulting mixture was heated to 100° C. to distill off the normal hexane, and the product was further dried under reduced pressure at 115° C. and 10 mmHg for 8 hours, thereby obtaining 36 g of a white fine powder.

Example 11

Following the procedure of Example 1, except that BLEMMER VMA70 was not added, 40 g of a carboxyl group-containing polymer composition was obtained as a white fine powder.

Example 12

Following the procedure of Example 1, except that polyoxyethylene hydrogenated castor oil triisostearate as the component (b1) was not added, and replaced by 1.00 g of polyoxyethylene castor oil as the component (b2), 37 g of a carboxyl group-containing polymer composition was obtained as a white fine powder.

Example 13

Following the procedure of Example 1, except that polyoxyethylene castor oil as the component (b2) was not added, and 0.20 g of polyoxyethylene hydrogenated castor oil triisostearate (Nihon Emulsion Co., Ltd.; EMALEX RWIS-305, HLB 2) as the component (b1) was further added, 37 g of a carboxyl group-containing polymer composition was obtained as a white fine powder.

Example 14

Following the procedure of Example 13, except that polyoxyethylene hydrogenated castor oil triisostearate (Nihon Emulsion Co., Ltd.; EMALEX RWIS-305, HLB 2) was replaced by polyoxyethylene hydrogenated castor oil triisostearate (Nihon Emulsion Co., Ltd.; EMALEX RWIS-310, HLB 3), 37 g of a carboxyl group-containing polymer composition was obtained as a white fine powder.

Example 15

Following the procedure of Example 1, except that the amount of polyoxyethylene hydrogenated castor oil triisostearate (Nihon Emulsion Co., Ltd.; EMALEX RWIS-350) as the component (b1) added was changed to 1.10 g, the amount of polyoxyethylene castor oil (Nikko Chemicals Co., Ltd.; Nikkol CO3) as the component (b2) added was changed to 0.40 g, and the amount of the monoisostearic acid polyethylene glycol-6 adduct as the component (c2) added was changed to 0.30 g, 36 of a carboxyl group-containing polymer composition was obtained as a white fine powder.

Example 16

Following the procedure of Example 1, except that the amount of polyoxyethylene hydrogenated castor oil triisostearate (Nihon Emulsion Co., Ltd.; EMALEX RWIS-350) as the component (b1) added was changed to 0.20 g, and the amount of the monoisostearic acid polyethylene glycol-6 adduct as the component (c2) added was changed to 1.40 g, 38 g of a carboxyl group-containing polymer composition was obtained as a white fine powder.

Comparative Example 1

Following the procedure of Example 1, except that the monoisostearic acid polyethylene glycol-6 adduct as the component (c2) was replaced by a sucrose fatty acid ester (DKS Corporation; DK ESTER F-70), 39 g of a carboxyl group-containing polymer composition was obtained as a white fine powder.

Comparative Example 2

Following the procedure of Example 1, except that the monoisostearic acid polyethylene glycol-6 adduct as the component (c2) was replaced by sorbitan isostearate (Nihon Emulsion Co., Ltd.; EMALEX SPIA 100), 37 g of a carboxyl group-containing polymer composition was obtained as a white fine powder.

Comparative Example 3

Following the procedure of Example 1, except that polyoxyethylene hydrogenated castor oil triisostearate, polyoxyethylene castor oil, and the monoisostearic acid polyethylene glycol-6 adduct were not used, 38 g of a carboxyl group-containing polymer composition was obtained as a white fine powder. The carboxyl group-containing polymer composition of Comparative Example 3 was an additive-free carboxyl group-containing polymer not containing the polyhydric alcohol fatty acid ester alkylene oxide adduct (B) and the polyoxyalkylene modified product (C).

Comparative Example 4

Following the procedure of Example 1, except that the monoisostearic acid polyethylene glycol-6 adduct as the component (c2) was not added, 38 g of a carboxyl group-containing polymer composition was obtained as a white fine powder.

Comparative Example 5

Following the procedure of Example 1, except that the monoisostearic acid polyethylene glycol-6 adduct as the component (c2) and polyoxyethylene castor oil as the component (b2) were not added, and the amount of polyoxyethylene hydrogenated castor oil triisostearate as the component (b1) was changed to 1.80 g, 39 g of a carboxyl group-containing polymer composition was obtained as a white fine powder.

Comparative Example 6

Following the procedure of Example 2, except that polyoxyethylene hydrogenated castor oil triisostearate as the component (b1) and polyoxyethylene castor oil as the component (b2) were not added, and replaced by 1.80 g of polyoxyethylene (4) lauryl ether as the component (c1), 37 g of a carboxyl group-containing polymer composition was obtained as a white tine powder.

Comparative Example 7

Following the procedure of Example 1, except that polyoxyethylene hydrogenated castor oil triisostearate as the component (b1) and the monoisostearic acid polyethylene glycol-6 adduct as the component (c2) were not added, and replaced by 1.80 g of polyoxyethylene castor oil as the component (b2), 39 g of a carboxyl group-containing polymer composition was obtained as a white fine powder.

TABLE 1

| Examples | Polyhydric Alcohol Saturated Fatty Acid Ester Alkylene Oxide Adduct (b1) Type | Amount of Use (Part by Mass) | Polyhydric Alcohol Unsaturated Fatty Acid Ester Alkylene Oxide Adduct (b2) Type | Amount of Use (Part by Mass) | Polyoxyalkylene Modified Product (C) Type | Amount of Use (Part by Mass) | Added Ratio [C]/[B] Ratio | Total Amount (Part by Mass) of Surfactant Used | Swelling Time (Min) without Stirring Concentration: 3 Mass % | Swelling Time (Min) without Stirring Concentration: 0.5 Mass % | Viscosity of Neutral Viscous Solution Measured Value (mPA·s) | Viscosity Ratio Relative to Comp. Ex. 3 | Light Transmittance (% T) of Neutral Viscous Solution |
|---|---|---|---|---|---|---|---|---|---|---|---|---|---|
| Ex. 1 | Polyoxyethylene Hydrogenated Castor Oil Triisostearate (HLB 9.6) | 2.00 | Polyoxyethylene Castor Oil (HLB 3) | 0.50 | Monoisostearic Acid Polyethylene Glycol-6 Adduct (c2) | 2.00 | 0.8 | 4.50 | 17 | 6 | 38,450 | 1.30 | 95 |
| Ex. 2 | Polyoxyethylene Hydrogenated Castor Oil Triisostearate (HLB 9.6) | 2.00 | Polyoxyethylene Castor Oil (HLB 3) | 0.50 | Polyoxyethylene (4) Lauryl Ether (c1) | 2.00 | 0.8 | 4.50 | 18 | 6 | 34,400 | 1.17 | 97 |
| Ex. 3 | Polyoxyethylene Hydrogenated Castor Oil Triisostearate (HLB 9.6) | 2.00 | Polyoxyethylene Castor Oil (HLB 3) | 0.50 | Polyoxyethylene (3) Lauryl Ether (c1) | 2.00 | 0.8 | 4.50 | 17 | 5 | 36,200 | 1.23 | 97 |
| Ex. 4 | Polyoxyethylene Hydrogenated Castor Oil Triisostearate (HLB 9.6) | 2.00 | Polyoxyethylene Castor Oil (HLB 3) | 0.50 | Polyoxyethylene (2) Lauryl Ether (c1) | 2.00 | 0.8 | 4.50 | 26 | 7 | 34,200 | 1.16 | 97 |
| Ex. 5 | Polyoxyethylene Hydrogenated Castor Oil Triisostearate (HLB 9.6) | 2.00 | Polyoxyethylene Castor Oil (HLB 3) | 0.50 | Polyoxyethylene (5) Lauryl Ether (c1) | 2.00 | 0.8 | 4.50 | 21 | 7 | 36,000 | 1.22 | 98 |
| Ex. 6 | Polyoxyethylene Hydrogenated Castor Oil Triisostearate (HLB 9.6) | 2.00 | Polyoxyethylene Castor Oil (HLB 3) | 0.50 | Polyoxyethylene (5) Isostearyl Ether (c1) | 2.00 | 0.8 | 4.50 | 16 | 5 | 35,900 | 1.22 | 97 |
| Ex. 7 | Polyoxyethylene Hydrogenated Castor Oil Triisostearate (HLB 9.6) | 2.00 | Polyoxyethylene Castor Oil (HLB 3) | 0.50 | Monoisostearic Acid Polyethylene Glycol-6 Adduct (c2) | 0.25 | 0.1 | 2.75 | 27 | 11 | 34,100 | 1.16 | 97 |
| Ex. 8 | Polyoxyethylene Hydrogenated Castor Oil Triisostearate (HLB 9.6) | 2.00 | Polyoxyethylene Castor Oil (HLB 3) | 0.50 | Monoisostearic Acid Polyethylene Glycol-6 Adduct (c2) | 5.00 | 2.0 | 7.50 | 17 | 6 | 43,000 | 1.46 | 95 |
| Ex. 9 | Polyoxyethylene Hydrogenated Castor Oil Triisostearate (HLB 9.6) | 2.00 | Polyoxyethylene Castor Oil (HLB 3) | 0.50 | Monoisostearic Acid Polyethylene Glycol-6 Adduct (c2) | 2.00 | 0.8 | 4.50 | 21 | 7 | 39,200 | 1.33 | 96 |
| Ex. 10 | Polyoxyethylene Hydrogenated Castor Oil Triisostearate (HLB 9.6) | 2.00 | Polyoxyethylene Castor Oil (HLB 3) | 0.50 | Monoisostearic Acid Polyethylene Glycol-6 Adduct (c2) | 2.00 | 0.8 | 4.50 | 22 | 7 | 36,500 | 1.24 | 95 |
| Ex. 11 | Polyoxyethylene Hydrogenated Castor Oil Triisostearate (HLB 9.6) | 2.00 | Polyoxyethylene Castor Oil (HLB 3) | 0.50 | Monoisostearic Acid Polyethylene Glycol-6 Adduct (c2) | 2.00 | 0.8 | 4.50 | 23 | 10 | 34,500 | 1.14 | 97 |
| Ex. 12 | Polyoxyethylene Hydrogenated Castor Oil Triisostearate (HLB 9.6) | 2.00 | Polyoxyethylene Castor Oil (HLB 3) | 2.50 | Monoisostearic Acid Polyethylene Glycol-6 Adduct (c2) | 2.00 | 0.8 | 4.50 | 12 | 3 | 49,200 | 1.67 | 89 |
| Ex. 13 | Polyoxyethylene Hydrogenated Castor Oil Triisostearate (HLB 9.6) / Polyoxyethylene Hydrogenated Castor Oil Triisostearate (HLB 2) | 2.00 / 0.50 | — | — | Monoisostearic Acid Polyethylene Glycol-6 Adduct (c2) | 2.00 | 0.8 | 4.50 | 17 | 5 | 33,400 | 1.13 | 95 |
| Ex. 14 | Polyoxyethylene Hydrogenated Castor Oil Triisostearate (HLB 9.6) / Polyoxyethylene Hydrogenated Castor Oil Triisostearate (HLB 3) | 2.00 / 0.50 | — | — | Monoisostearic Acid Polyethylene Glycol-6 Adduct (c2) | 2.00 | 0.8 | 4.50 | 27 | 7 | 32,200 | 1.09 | 95 |

TABLE 1-continued

| Examples | Polyhydric Alcohol Saturated Fatty Acid Ester Alkylene Oxide Adduct (b1) Type | Amount of Use (Part by Mass) | Polyhydric Alcohol Unsaturated Fatty Acid Ester Alkylene Oxide Adduct (b2) Type | Amount of Use (Part by Mass) | Polyoxyalkylene Modified Product (C) Type | Amount of Use (Part by Mass) | Added Ratio [C]/[B] Ratio | Total Amount (Part by Mass) of Surfactant Used | Swelling Time (Min) without Stirring Concentration: 3 Mass % | Swelling Time (Min) without Stirring Concentration: 0.5 Mass % | Viscosity of Neutral Viscous Solution Measured Value (mPa·s) | Viscosity Ratio Relative to Comp. Ex. 3 | Light Transmittance (% T) of Neutral Viscous Solution |
|---|---|---|---|---|---|---|---|---|---|---|---|---|---|
| Ex. 15 | Polyoxyethylene Hydrogenated Castor Oil Triisostearate (HLB 9.6) | 2.75 | Polyoxyethylene Castor Oil (HLB 3) | 1.00 | Monoisostearic Acid Polyethylene Glycol-6 Adduct (c2) | 0.75 | 0.2 | 4.50 | 15 | 3 | 47,000 | 1.59 | 91 |
| Ex. 16 | Polyoxyethylene Hydrogenated Castor Oil Triisostearate (HLB 9.6) | 0.5 | Polyoxyethylene Castor Oil (HLB 3) | 0.50 | Monoisostearic Acid Polyethylene Glycol-6 Adduct (c2) | 3.50 | 3.5 | 4.50 | 25 | 15 | 42,000 | 1.42 | 93 |
| Comp. Ex. 1 | Polyoxyethylene Hydrogenated Castor Oil Triisostearate (HLB 9.6) | 2.00 | Polyoxyethylene Castor Oil (HLB 3) | 0.50 | Sucrose Fatty Acid Ester | 2.00 | 0.8 | 4.50 | 60< | 47 | 55,000 | 1.86 | 89 |
| Comp. Ex. 2 | Polyoxyethylene Hydrogenated Castor Oil Triisostearate (HLB 9.6) | 2.00 | Polyoxyethylene Castor Oil (HLB 3) | 0.50 | Sorbitan Isostearate | 2.00 | 0.8 | 4.50 | 60< | 50 | 36,000 | 1.22 | 95 |
| Comp. Ex. 3 | — | — | — | — | — | — | — | — | 60< | 60< | 29,500 | 1.00 | 97 |
| Comp. Ex. 4 | Polyoxyethylene Hydrogenated Castor Oil Triisostearate (HLB 9.6) | 2.00 | Polyoxyethylene Castor Oil (HLB 3) | 0.50 | — | — | — | 2.50 | 37 | 15 | 32,000 | 1.08 | 97 |
| Comp. Ex. 5 | Polyoxyethylene Hydrogenated Castor Oil Triisostearate (HLB 9.6) | 4.50 | — | — | — | — | — | 4.50 | 45 | 9 | 39,100 | 1.33 | 98 |
| Comp. Ex. 6 | — | — | — | — | Polyoxyethylene (4) Lauryl Ether (c1) | 4.50 | — | 4.50 | 60< | 60< | 38,400 | 1.30 | 93 |
| Comp. Ex. 7 | — | — | Polyoxyethylene Castor Oil (HLB 3) | 4.50 | — | — | — | 4.50 | 9 | 2 | 60,000 | 2.03 | 82 |

Example 1 shows that the carboxyl group-containing polymer composition containing, in addition to the carboxyl group-containing polymer (A), the polyhydric alcohol saturated fatty acid ester alkylene oxide adduct (b1), the polyhydric alcohol unsaturated fatty acid ester alkylene oxide adduct (b2), and the polyoxyalkylene fatty acid ester (c2) has excellent dispersibility in water under high-concentration conditions, and forms a neutral viscous solution having a minimal change in viscosity due to the thermal history in the drying step, and having high transparency with a transmittance of 90% or more.

Examples 2 to 6 also show that the carboxyl group-containing polymer compositions each containing, in addition to the carboxyl group-containing polymer (A), the polyhydric alcohol saturated fatty acid ester alkylene oxide adduct (b1), the polyhydric alcohol unsaturated fatty acid ester alkylene oxide adduct (b2), and the ether (c1) of a polyoxyalkylene with a fatty alcohol have excellent dispersibility in water under high-concentration conditions, and form neutral viscous solutions having a minimal change in viscosity due to the thermal history in the drying step, and having high transparency with a transmittance of 90% or more.

Examples 7 and 8 show that even if the amount of the polyoxyalkylene modified product (C) used is changed, the carboxyl group-containing polymer compositions of the examples have excellent dispersibility in water under high-concentration conditions, and form neutral viscous solutions having a minimal change in viscosity due to the thermal history in the drying step, and having high transparency with a transmittance of 90% or more.

Examples 9 and 10 show that even if the polyhydric alcohol saturated fatty acid ester alkylene oxide adduct (b1), the polyhydric alcohol unsaturated fatty acid ester alkylene oxide adduct (b2), and the polyoxyalkylene modified product (C) are added either in the course of polymerization or after the completion of polymerization, these carboxyl group-containing polymer compositions have excellent dispersibility in water under high-concentration conditions, and form neutral viscous solutions having a minimal change in viscosity due to the thermal history in the drying step, and having high transparency with a transmittance of 90% or more.

Example 11 shows that even if an α,β unsaturated compound is not added during the polymerization of the carboxyl group-containing polymer, the carboxyl group-containing polymer composition containing, in addition to the carboxyl group-containing polymer (A), the polyhydric alcohol saturated fatty acid ester alkylene oxide adduct (b1), the polyhydric alcohol unsaturated fatty acid ester alkylene oxide adduct (b2), and the polyoxyalkylene fatty acid ester (c2) has excellent dispersibility in water under high-concentration conditions, and forms a neutral viscous solution having a minimal change in viscosity due to the thermal history in the drying step, and having high transparency with a transmittance of 90% or more.

Example 12 shows that when the polyhydric alcohol unsaturated fatty acid ester alkylene oxide adduct (b2) only is used as the polyhydric alcohol fatty acid ester alkylene oxide adduct (B), the resulting carboxyl group-containing polymer composition exhibits a slight increase in the viscosity ratio relative to Comparative Example 3, and a slight decrease in the transparency of the neutral viscous solution, yet has excellent dispersibility in water under high-concentration conditions, thus forming a neutral viscous solution with high transparency and a reduced change in viscosity due to the thermal history in the drying step.

Examples 13 and 14 show that when the polyhydric alcohol saturated fatty acid ester alkylene oxide adduct (b1) only is used as the polyhydric alcohol fatty acid ester alkylene oxide adduct (B), the resulting carboxyl group-containing polymer compositions have excellent dispersibility in water under high-concentration conditions, and form neutral viscous solutions having a minimal change in viscosity due to the thermal history in the drying step, and having high transparency with a transmittance of 90% or more.

Examples 1, 7, 8, 15, and 16 show that when the [C]/[B] ratio is 0.1 to 4, the resulting carboxyl group-containing polymer compositions have excellent dispersibility in water under high-concentration conditions, and form neutral viscous solutions having a minimal change in viscosity due to the thermal history in the drying step, and having high transparency with a transmittance of 90% or more, and when the [C]/[B] ratio is 0.2 to 2, the resulting carboxyl group-containing polymer compositions have excellent dispersibility in water under high-concentration conditions, and form neutral viscous solutions having a minimal change in viscosity due to the thermal history in the drying step, and having high transparency with a transmittance of 90% or more.

Comparative Examples 1 and 2 show that when other additives are used instead of the polyoxyalkylene modified product (C), the resulting carboxyl group-containing polymer compositions have insufficient dispersibility and form neutral viscous solutions with a large increase in viscosity.

Comparative Examples 3 to 7 show that if even one of the polyhydric alcohol fatty acid ester alkylene oxide adduct (B) and the polyoxyalkylene modified product (C) is not incorporated, the resulting carboxyl group-containing polymer compositions cannot demonstrate sufficient performance in any of the dispersibility in water under high-concentration conditions, the viscosity of neutral viscous solution, and the transparency of neutral viscous solution.

The invention claimed is:

1. A carboxyl group-containing polymer composition comprising:
   (A) a carboxyl group-containing polymer obtained by copolymerization of an α,β-unsaturated carboxylic acid (a1) and a compound (a2) having at least two or more ethylenically unsaturated groups per molecule;
   (B) a polyhydric alcohol fatty acid ester alkylene oxide adduct; and
   (C) a polyoxyalkylene modified product, which is at least one of an ether (c1) of a polyoxyalkylene with a fatty alcohol, and a polyoxyalkylene fatty acid ester (c2).

2. The carboxyl group-containing polymer composition according to claim 1, wherein the polyoxyalkylene modified product (C) comprises a polyoxyalkylene modified product having an HLB value of 6 to 15.

3. The carboxyl group-containing polymer composition according to claim 1, wherein the polyoxyalkylene modified product (C) comprises a polyoxyalkylene modified product that is liquid at 25° C. under atmospheric pressure.

4. The carboxyl group-containing polymer composition according to claim 1, wherein the polyhydric alcohol fatty acid ester alkylene oxide adduct (B) comprises at least one of a polyhydric alcohol saturated fatty acid ester alkylene oxide adduct (b1) and a polyhydric alcohol unsaturated fatty acid ester alkylene oxide adduct (b2).

5. The carboxyl group-containing polymer composition according to claim 4, wherein an amount of the polyhydric alcohol saturated fatty acid ester alkylene oxide adduct (b1), per 100 parts by mass of the α,β-unsaturated carboxylic acid (a1), is 0.01 to 10 parts by mass.

6. The carboxyl group-containing polymer composition according to claim 4, wherein an amount of the polyhydric alcohol unsaturated fatty acid ester alkylene oxide adduct (b2), per 100 parts by mass of the α,β-unsaturated carboxylic acid (a1), is 0.1 to 5 parts by mass.

7. The carboxyl group-containing polymer composition according to claim 1, wherein an amount of the polyoxyalkylene modified product (C), per 100 parts by mass of the α,β-unsaturated carboxylic acid (a1), is 0.1 to 10 parts by mass.

8. A neutral viscous solution, which is a mixture of the carboxyl group-containing polymer composition according to claim 1, water, and an alkaline compound.

* * * * *